US006948053B2

United States Patent
Augsburg et al.

(10) Patent No.: US 6,948,053 B2
(45) Date of Patent: Sep. 20, 2005

(54) EFFICIENTLY CALCULATING A BRANCH TARGET ADDRESS

(75) Inventors: Victor Roberts Augsburg, Cary, NC (US); Jeffrey Todd Bridges, Raleigh, NC (US); Thomas Andrew Sartorius, Raleigh, NC (US); Rodney Wayne Smith, Raleigh, NC (US); Thomas Philip Speier, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 10/082,144

(22) Filed: Feb. 25, 2002

(65) Prior Publication Data

US 2003/0163677 A1 Aug. 28, 2003

(51) Int. Cl.$^7$ ................................................. G06F 9/32
(52) U.S. Cl. ....................................... 712/233; 712/213
(58) Field of Search .................................. 712/233, 213

(56) References Cited

U.S. PATENT DOCUMENTS

| | | | | |
|---|---|---|---|---|
| 5,142,634 A | | 8/1992 | Fite et al. ..................... | 395/375 |
| 5,367,649 A | | 11/1994 | Cedar .......................... | 395/375 |
| 5,522,053 A | | 5/1996 | Yoshida et al. ......... | 395/421.03 |
| 5,737,561 A | | 4/1998 | Dulong ........................ | 395/391 |
| 5,778,423 A | | 7/1998 | Sites et al. .................. | 711/118 |
| 5,790,845 A | | 8/1998 | Shimada et al. ............ | 395/585 |
| 5,796,998 A | | 8/1998 | Levitan et al. .............. | 395/586 |
| 5,832,260 A | * | 11/1998 | Arora et al. ................. | 712/239 |
| 5,878,254 A | | 3/1999 | Shimada et al. ............ | 395/585 |
| 5,907,714 A | * | 5/1999 | Boutaud et al. .............. | 712/23 |
| 6,167,506 A | * | 12/2000 | Witt ............................ | 712/213 |
| 6,237,087 B1 | * | 5/2001 | O'Connor .................... | 712/226 |
| 6,279,106 B1 | * | 8/2001 | Roberts ....................... | 712/239 |
| 6,438,671 B1 | * | 8/2002 | Doing et al. ................ | 711/173 |

FOREIGN PATENT DOCUMENTS

| | | |
|---|---|---|
| GB | 2250840 A | 11/1993 |
| WO | WO99/19793 | 4/1999 |

OTHER PUBLICATIONS

B. Appelbe et al. "Hoisting Branch Conditions—Improving Super–Scalar Processor Performance," *Languages and Compilers for Parallel Computing, 8$^{th}$ International Workshop, LCPC '95*, Aug. 1995, pp. 304–317.

J. C. Chan et al. "Compiler–Driven Hybrid Dynamic Branch Predictor," *IBM Technical Disclosure Bulletin*, vol. 36, No. 02, Feb. 1993, pp. 127–130.

A. G. Liles et al. "Branch Prediction Mechanism," *IBM Technical Disclosure Bulletin*, vol. 22, No. 7, Dec. 1979, pp. 3013–3016.

V. R Augsburg et al., Pending Patent Application, "Re–Encoding Illegal Op Codes into a Single Illegal Op Code to Accommodate the Extra Bits Associated with Pre–Decoded Instructions".

* cited by examiner

Primary Examiner—Eric Coleman
(74) Attorney, Agent, or Firm—Robert A. Voigt, Jr.; Winstead Sechrest & Minick P.C.

(57) ABSTRACT

A method and system for calculating a branch target address. Upon fetching a branch instruction from memory, the n–1 lower order bits of the branch target address may be pre-calculated and stored in the branch instruction prior to storing the branch instruction in the instruction cache. Upon retrieving the branch instruction from the instruction cache, the upper order bits of the branch target address may be recovered using the sign bit and the carry bit stored in the branch instruction. The sign bit and the carry bit may be used to select one of three possible upper-order bit value combinations of the branch target address. The selected upper-order bit value combination may then be appended to the n–1 lower order bits of the branch target address to form the complete branch target address.

41 Claims, 9 Drawing Sheets

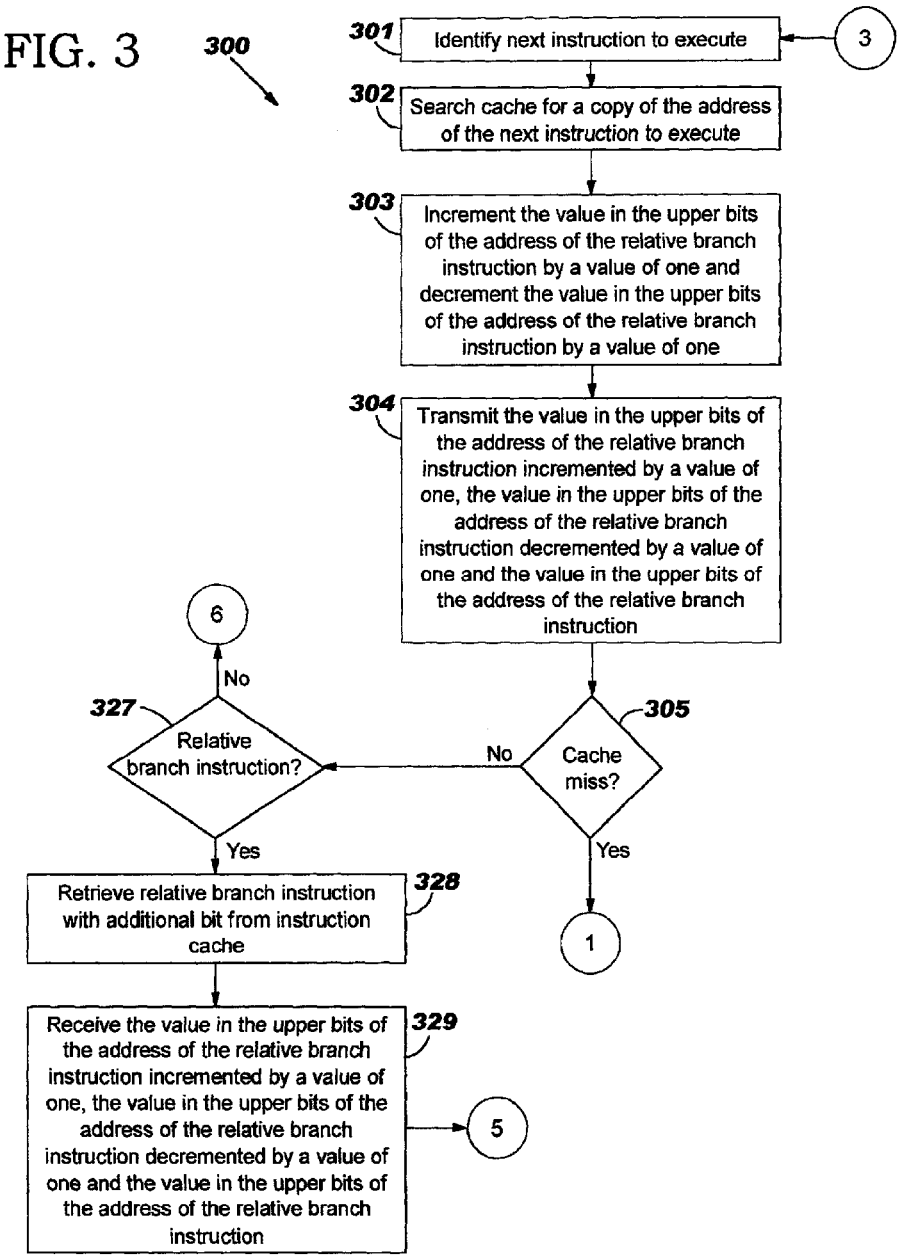

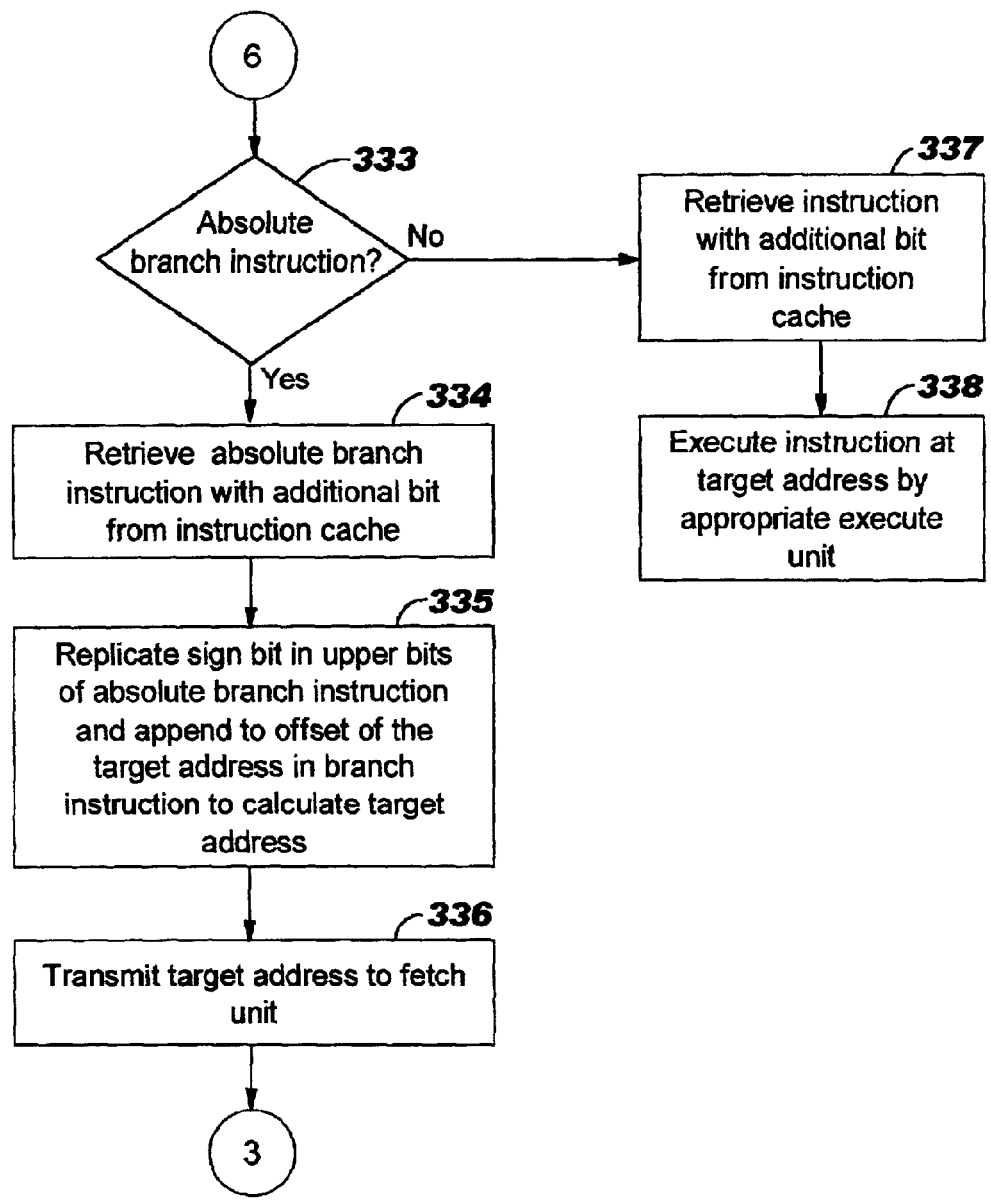

EFFICIENTLY CALCULATING A BRANCH TARGET ADDRESS

CROSS REFERENCE TO RELATED APPLICATION

The present invention is related to the following U.S. patent application which is incorporated herein by reference:

Ser. No. 10/082,085, now U.S. Pat. No. 6,81,962, entitled "Re-Encoding Illegal Op Codes Into a Single Illegal Op Code to Accommodate the Extra Bits Associated with Pre-Decoded Instructions" filed Feb. 25, 2002.

TECHNICAL FIELD

The present invention relates to the field of instruction execution in computers, and more particularly to calculating a target address for a branch instruction upon fetching the branch instruction from an instruction cache without implementing adders while not substantially increasing the instruction length.

BACKGROUND INFORMATION

Program instructions for a microprocessor are typically stored in sequential, addressable locations within a memory. When these instructions are processed, the instructions may be fetched from consecutive memory locations and stored in a cache commonly referred to as an instruction cache. The instructions may then be retrieved from the instruction cache and executed. Each time an instruction is fetched from memory, a next instruction pointer within the microprocessor may be updated so that it contains the address of the next instruction in the sequence. The next instruction in the sequence may commonly be referred to as the next sequential instruction pointer. Sequential instruction fetching, updating of the next instruction pointer and execution of sequential instructions continues linearly through memory until an instruction, commonly referred to as a branch instruction, is encountered. A branch instruction may refer to an instruction that may result in a change in an address in the next instruction pointer that is not the next sequential address, and thereby causes the flow of the program to be altered. That is, a branch instruction may cause a break in the sequence of instruction execution so that the next instruction executed may not be in sequential order.

Typically, a branch instruction may comprise information in order to calculate what is commonly referred to as the target address, if the branch is taken. The target address is the address of the next instruction to execute. The target address may be calculated after the instruction is fetched from the instruction cache. Typically, a portion of the instruction fetched from the instruction cache comprises an offset of the target address that may be added to the address of the branch instruction to calculate the target address by adders. The number of bits of the offset may differ among various architectures, but the width of the addition is generally the width of the instruction address. In some microprocessor designs, this addition may limit the execution speed of the microprocessor since the addition may utilize valuable processor cycles.

The addition of the offset of the target address in the instruction with the instruction address after the branch instruction is fetched from the instruction cache may be avoided at least in part by encoding the entire target address in the instruction prior to being stored in the instruction cache. That is, the complete target address may be pre-calculated and stored in the branch instruction prior to the branch instruction being stored in the instruction cache. Upon retrieving the branch instruction, the target address may then be simply read from the instruction without any addition. However, by storing the complete target address in the branch instruction, the size of the instruction cache may have to be expanded since the number of bits of the instruction may have to be increased to store the target address. For example, a 32-bit instruction with a 16-bit offset may have to be expanded an additional 16 bits in order to store a 32-bit target address. As a result, the 32-bit instruction may now have to be expanded to 48 bits. Subsequently, each instruction may have to be 48 bits in length instead of 32 bits thereby effectively increasing the instruction cache size by 50%.

It would therefore be desirable to develop a technique for calculating the target address of a branch instruction upon fetching the branch instruction from the instruction cache without implementing adders while not substantially increasing the instruction length.

SUMMARY

The problems outlined above may at least in part be solved in some embodiments by fetching an instruction from a memory and determining if that instruction is a relative branch instruction. A relative branch instruction may be an instruction that stores n bits of an offset of a target address that may be used to calculate the n−1 least significant bits of the target address of the relative branch instruction. Upon determining that the instruction is a relative branch instruction, a value stored in n−1 least significant bits of the offset of the target address may be added to a value stored in the n−1 least significant bits of the address of the relative branch instruction. The result of the above calculation may result in calculating the n−1 least significant bits of the target address of the relative branch instruction along with a carry bit. The carry bit may then be appended to the relative branch instruction thereby expanding the length of the relative branch instruction by one bit. The relative branch instruction may be stored in the instruction cache. The relative branch instruction may be then be retrieved by a decode/selecting logic unit coupled to the instruction cache. The decode/selecting logic unit may further receive the following multiplicity of values: a value in the upper bits of the address of the relative branch instruction incremented by a value of one, the value in the upper bits of the address of the relative branch instruction decremented by a value of one and the value in the upper bits of the address of the relative branch instruction. Based on the binary value of the sign bit and the carry bit in the relative branch instruction, the decode/selecting logic unit may select one of the following values: the value in the upper bits of the address of the relative branch instruction incremented by a value of one, the value in the upper bits of the address of the relative branch instruction decremented by a value of one and the value in the upper bits of the address of the relative branch instruction. The selection may then be appended to the n−1 least significant bits of the target address to form the complete target address. Consequently, the target address of a branch instruction upon retrieving the branch instruction from the instruction cache may be calculated without implementing adders while not substantially increasing the instruction length.

In one embodiment of the present invention, a method for calculating a branch target address may comprise the step of fetching an instruction from a memory by an instruction cache coupled to the memory. A determination may be made by an encoding logic unit coupled to the instruction cache as to whether the fetched instruction is a relative branch instruction. A relative branch instruction may be an instruction that stores n bits of an offset of a target address that may be used to calculate the n−1 least significant bits of the target address of the relative branch instruction. The n−1 least significant bits of the target address of the relative branch instruction may be calculated by adding a value stored in the offset of the target address to a value stored in the address of the branch instruction as explained in greater detail below.

If the encoding logic unit determines that the fetch instruction is a relative branch instruction, then the n−1 least significant bits of the target address of the relative branch instruction may be calculated. In one embodiment, the n−1 least significant bits of the target address of the relative branch instruction may be calculated by adding the value stored in the n−1 least significant bits of the offset of the target address with the value stored in the n−1 least significant bits of the address of the relative branch instruction. A carry bit storing the value of the carry in the above addition may be appended to the relative branch instruction thereby expanding the length of the instruction by one bit. The relative branch instruction may then be stored in an instruction cache coupled to the encoding logic unit.

The relative branch instruction stored in the instruction cache may be retrieved by a decode/selecting logic unit coupled to the instruction cache. The relative branch instruction retrieved by the decode/selecting logic unit may comprise a sign bit and a carry bit as well as the result of the above addition, i.e., the n−1 least significant bits of the target address.

The decode/selecting logic unit may further receive a multiplicity of values: the value in the upper bits of the address of the relative branch instruction, the value in the upper bits of the address of the relative branch instruction decremented by the value of one and the value in the upper bits of the address of the relative branch instruction incremented by the value of one. These values may have been generated and transmitted by a fetch unit coupled to the instruction cache and received by the decode/selecting logic unit prior to the decode/selecting logic unit retrieving the relative branch instruction from the instruction cache.

The decode/selecting logic unit may select one of the following values: the value in the upper bits of the address of the relative branch instruction, the value in the upper bits of the address of the relative branch instruction decremented by the value of one or the value in the upper bits of the address of the relative branch instruction incremented by the value of one based on the binary value of the sign bit and carry bit.

Upon the selection, the decode/selecting logic unit may append the n−1 least significant bits of the target address with the selection thereby forming the complete branch target address. Subsequently, the branch target address may be calculated without implementing adders while not substantially increasing the length of the instruction.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
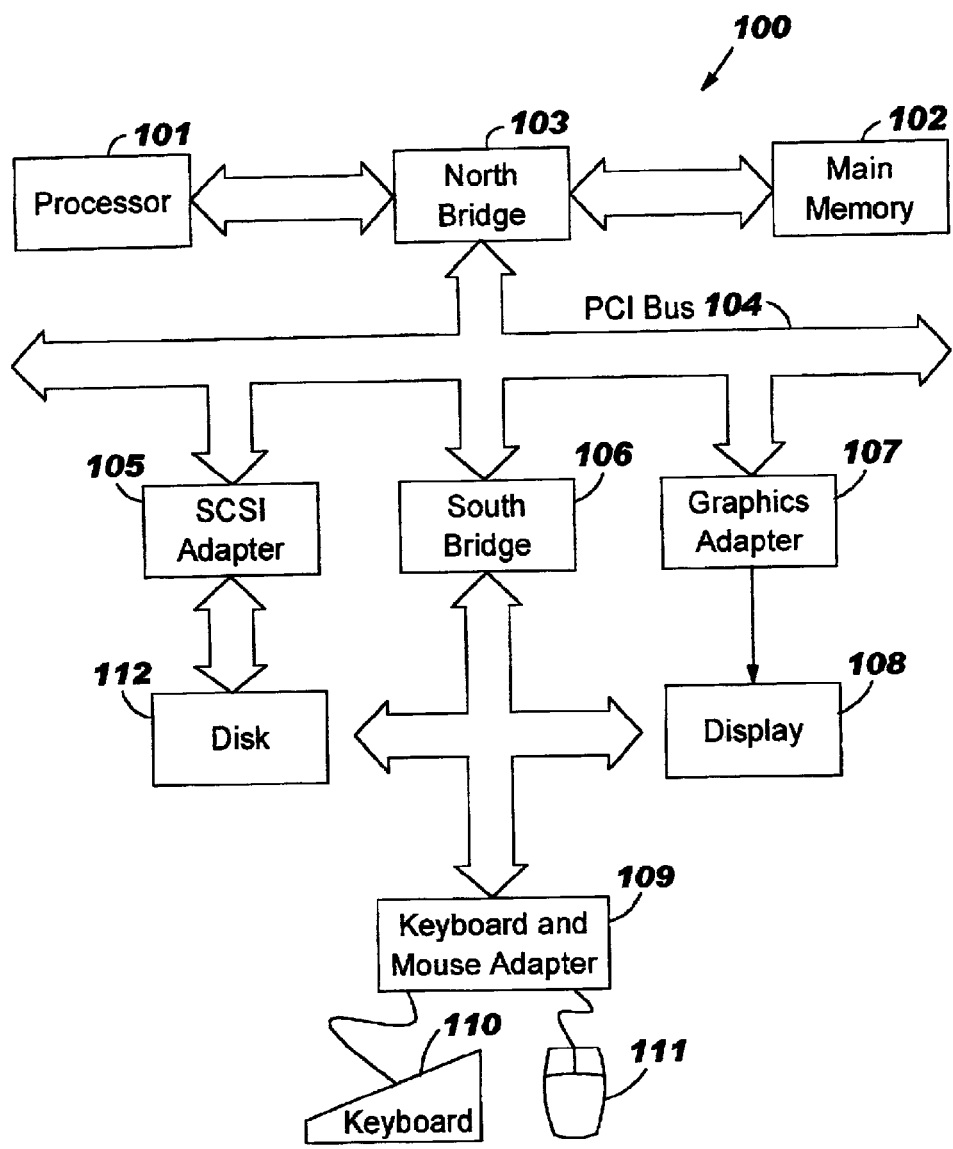
FIG. 1 illustrates a computer system configured in accordance with the present invention.

FIG. 1—Computer System

FIG. 1 illustrates an embodiment of a computer system 100 in accordance with the present invention. Computer system 100 may employ a peripheral component interconnect (PCI) local bus architecture. Although the depicted example employs a PCI bus, other bus architectures such as Accelerated Graphics Port (AGP) and Industry Standard Architecture (ISA), may be used. Processor 101 and main memory 102 configured to store instructions, e.g., branch instructions, may be connected to PCI local bus 104 through north bridge 103. North bridge 103 may also include an integrated memory controller and cache memory for processor 101. A more detailed description of processor 101 is described further below in connection with FIG. 2. Additional components coupled to PCI bus 104 may be made through direct component interconnection or through add-in boards. In the depicted example, Small Computer System Interface (SCSI) host bus adapter 105 and south bridge 106 may be connected to PCI local bus 104 by direct component connection. In contrast, graphics adapter 107 may be connected to PCI local bus 104 by add-in boards inserted into expansion slots. The processes of the present invention may be used to manage rendering of data by graphics adapter 107. Graphics adapter 107 may be provided to control the rendering of text and images on a display 108.

South bridge 106 may provide a connection for a keyboard and mouse adapter 109. A keyboard 110 and a mouse 111 may be connected to keyboard and mouse adapter 109. SCSI host bus adapter 105 may provide a connection for disk drive 112, e.g., hard disk. Typical PCI local bus implementations may support three or four PCI expansion slots or add-in connectors.

Those of ordinary skill in the art will appreciate that the hardware in FIG. 1 may vary depending on the implementation. Other internal hardware or peripheral devices, such as flash ROM (or equivalent non-volatile memory) or optical disk drives and the like, may be used in addition to or in place of the hardware depicted in FIG. 1.

The depicted example in FIG. 1 and the above-described example are not meant to imply architectural limitations. For example, computer system 100 may be a notebook computer or hand held computer in addition to taking the form of a Personal Digital Assistant (PDA).

FIG. 2—Processor

Figure 2:
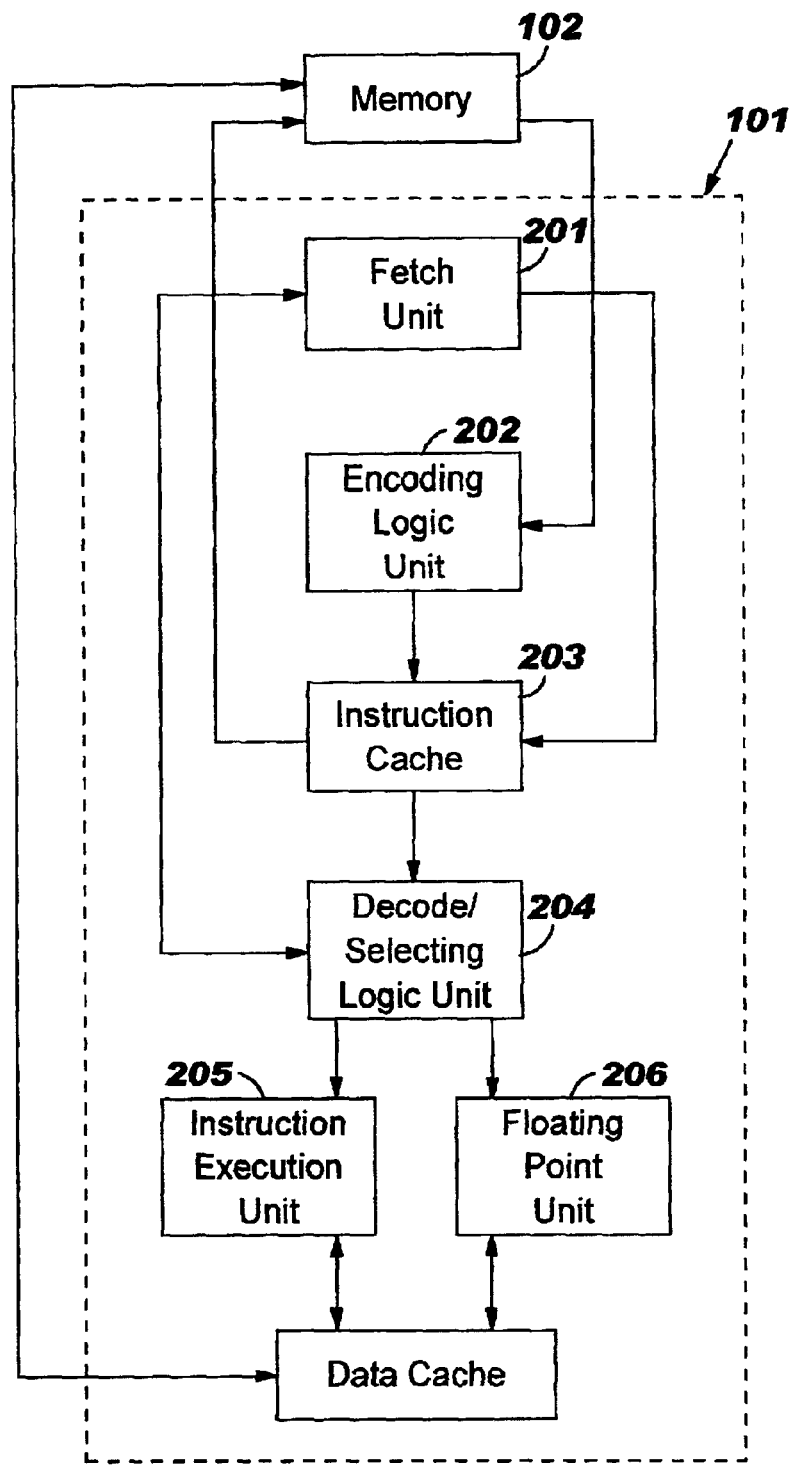
FIG. 2 illustrates a processor in the computer system configured in accordance with the present invention.

FIG. 2 illustrates an embodiment of processor 101 in accordance with the present invention. Processor 101 may comprise a fetch unit 201 coupled to an instruction cache 203 and to a decode/selecting logic unit 204. Encoding logic unit 202 may be coupled to memory 102 (FIG. 1) and to instruction cache 203. Instruction cache 203 may be further coupled to memory 102 and to decode/selecting logic unit 204. Decode/selecting logic unit 204 may be further coupled to an instruction execution unit 205 and a floating point unit 206. Instruction execution unit 205 and floating point unit 206 may be coupled to data cache 207. Instruction execution unit 205 and floating point unit 206 may comprise a plurality of execution units and floating point units, respectively. Data cache 207 may be further coupled to memory 102. It is noted that processor 101 may comprise additional units not shown and that FIG. 2 is illustrative.

Referring to FIGS. 1 and 2, fetch unit 201 may be configured to identify the next instruction to be executed by processor 101. Fetch unit 201 may further be configured to generate a multiplicity of values based on the address of the identified instruction. Fetch unit 201 may be configured to generate the following multiplicity of values: the value in the upper bits of the address of the instruction identified incremented by the value of one and the value in the upper bits of the address decremented by the value of one. Fetch unit 201 may further be configured to transmit the following values to decode/selecting logic unit 204: the value in the upper bits of the address of the instruction identified, the value in the upper bits of the address of the instruction identified incremented by the value of one and the value in the upper bits of the address decremented by the value of one may be transmitted to decode/selecting logic unit 204. These values may be used to calculate the complete target address of the instruction if the instruction is a relative branch instruction as explained in greater detail in conjunction with FIG. 3.

Upon identifying the next instruction to be executed, fetch unit 201 may be configured to search instruction cache 203 to determine if a copy of the address of the next instruction to be executed is located within instruction cache 203. If a copy of the address is located within instruction cache 203, a "cache hit" is said to occur. If a copy of the address is not located within instruction cache 203, a "cache miss" is said to occur.

If a cache miss occurs, then instruction cache 203 may be configured to fetch the instruction from memory 201. The instruction fetched may then be encoded by encoding logic unit 202. Encoding logic unit 202 may determine if the received instruction is a relative branch instruction, an absolute branch instruction or a non-branch instruction. Both a relative and an absolute branch instruction may be a branch instruction that comprises an offset of the target address of the next instruction to be executed. A relative branch instruction may store n bits of an offset of the target address where a value in the n−1 least significant bits in the offset may be added to the n−1 least significant bits of the address of the branch instruction in order to calculate the n−1 least significant bits of the target address as explained in greater detail in conjunction with FIG. 3. However, a target address may be calculated in an absolute branch instruction by sign extending the offset of the target address as explained in greater detail in conjunction with FIG. 3. Upon encoding logic unit 202 determining the type of instruction received, encoding logic unit 202 may then be configured to encode the instruction accordingly as further described in conjunction with FIG. 3.

Upon encoding the fetched instruction from memory 102, encoding logic unit 202 may be configured to store the encoded instruction in instruction cache 203. Instruction cache 203 may be a high-speed cache memory configured for storing instructions. Instruction cache 203 may be configured to store commonly or recently accessed blocks of data. It is noted that instruction cache 203 may be configured with any associativity, e.g., set associative or direct map configuration. Instructions in instruction cache 203 may be retrieved by decode/selecting logic unit 204. These instructions may be decoded by decode/selecting logic unit 204 as detailed further below.

As stated above, fetch unit 201 may be configured to search instruction cache 203 to determine if a copy of the address of the next instruction to be executed is located within instruction cache 203. If a copy of the address of the next instruction to be executed as identified by fetch unit 201 was located within instruction cache 203, then a cache hit is said to occur. If a cache hit occurs, then the n−1 least significant bits of the target address of the branch instruction have already been calculated and stored in the n−1 least significant bits of the branch instruction as explained in greater detail in conjunction with FIG. 3. Consequently, the n−1 least significant bits of the target address of the branch instruction do not have to be calculated. Furthermore, if a cache hit occurs, the instruction, whether a branch instruction or a non-branch instruction, may be retrieved by decode/selecting logic unit 204. These instructions may be decoded by decode/selecting logic unit 204 as detailed below.

Decode/selecting logic unit 204 may be configured to decode instructions retrieved from instruction cache. If the instruction is a relative branch instruction, decode/selecting logic unit 204 may be configured to determine the target address of the relative branch instruction without implementing an adder(s) as described in greater detail in conjunction with FIG. 3 thereby preventing the consumption of processor cycles from adding the offset of the target address with the address of the branch instruction. If the instruction is an absolute branch instruction, decode/selecting logic unit 204 may be configured to determine the target address of the absolute branch instruction by sign extending the upper bits of the absolute branch instruction with the offset of the target address stored in the absolute branch instruction as explained in greater detail in conjunction with FIG. 3. If the instruction is a type of branch instruction, e.g., relative branch instruction, absolute branch instruction, then decode/selecting logic unit 204 may be further configured to transmit the target address to fetch unit 201. Fetch unit 201 may then be configured to determine if the instruction at the target address is the next instruction to execute.

If the instruction received by decode/selecting logic unit 204 is a non-branch instruction, then decode/selecting logic unit 204 may dispatch the decoded instruction to either instruction execution unit 205 or floating point unit 206 depending upon the type of instruction detected. Floating point instructions are dispatched to floating point unit 206 and integer instructions are dispatched to instruction execution unit 205. The decoded non-branch instructions may comprise control signals used by instruction execution unit 205 or floating point unit 206 to execute the instruction.

In one embodiment, instruction execution unit 205 may comprise a plurality of execution units. In one particular embodiment, each execution unit may be configured to execute the same subset of the instructions as the other execution units. In another embodiment, each execution unit may be asymmetrical and configured to execute dissimilar subsets of the instruction set. For example, instruction execution unit 205 may comprise a branch execution unit for executing branch instructions and one or more arithmetic logic units for executing arithmetic and logical instructions. Similarly, floating point unit 206 may comprise a plurality of floating point units. The floating point units may be either symmetrical or asymmetrical. For example, asymmetrical floating point units may comprise an add/subtract floating point unit and a multiplication floating point unit.

Instruction unit 205 and floating point unit 206 may additionally be interfaced to data cache 207 for reading and storing operands to memory 102. Instructions may comprise both register operands and memory operands. When an integer or floating point instruction encounters a source memory operand, the address of the memory operand is provided to data cache 207. If the memory operand is stored within data cache 207, the data may be transferred to instruction execution unit 205 or floating point unit 206. If the memory operand is not stored within data cache 207, data cache 207 may load the cache line that includes the memory operand from memory 102 and transfer the data to either instruction execution unit 205 or floating point unit 206. In one embodiment, instruction results are written to data cache 207 and memory 102 to maintain cache coherency.

As stated in the Background Information section, a target address may be calculated from a branch instruction after the branch instruction is fetched from an instruction cache. Typically, a portion of the branch instruction fetched from the instruction cache comprises an offset of the target address that may be added to the address of the branch instruction to calculate the target address by adders. The number of bits of the offset may vary between various architectures, but the width of the addition is generally the width of the instruction address. In some microprocessor designs, this addition may limit the execution speed of the microprocessor since the addition may utilize valuable processor cycles. The addition of the offset of the target address in the branch instruction with the branch instruction address after the branch instruction is fetched from the instruction cache may be avoided at least in part by encoding the entire target address in the instruction prior to being stored in the instruction cache. However, by storing the complete target address in the branch instruction, the size of the instruction cache may have to be expanded since the number of bits of the instruction may have to be increased to store the target address. For example, a 32-bit instruction with a 16-bit offset may have to be expanded an additional 16 bits in order to store a 32-bit target address. As a result, the 32-bit instruction may now have to be expanded to 48 bits. Subsequently, each instruction may have to be 48 bits in length instead of 32 bits thereby effectively increasing the instruction cache size by 50%. It would therefore be desirable to develop a technique for calculating the target address of a branch instruction upon fetching the branch instruction from the instruction cache without implementing adders while not substantially increasing the instruction length. A method for calculating the target address of a branch instruction upon fetching the branch instruction from the instruction cache without implementing adders while not substantially increasing the instruction length is described below in conjunction with FIG. 3.

Figure 3:
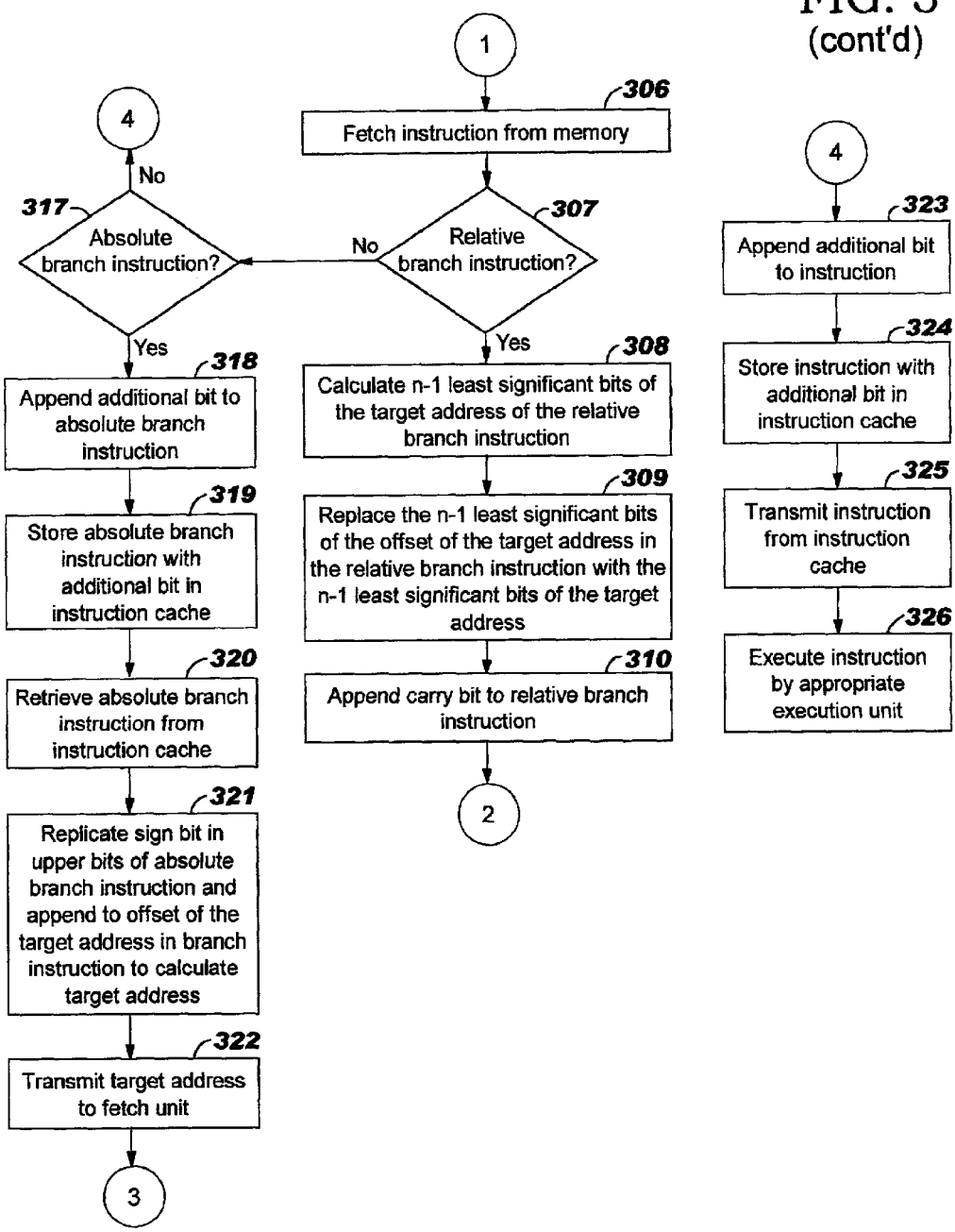
FIG. 3 is a flowchart of a method for calculating a target address in accordance with the present invention.
Figure 3:
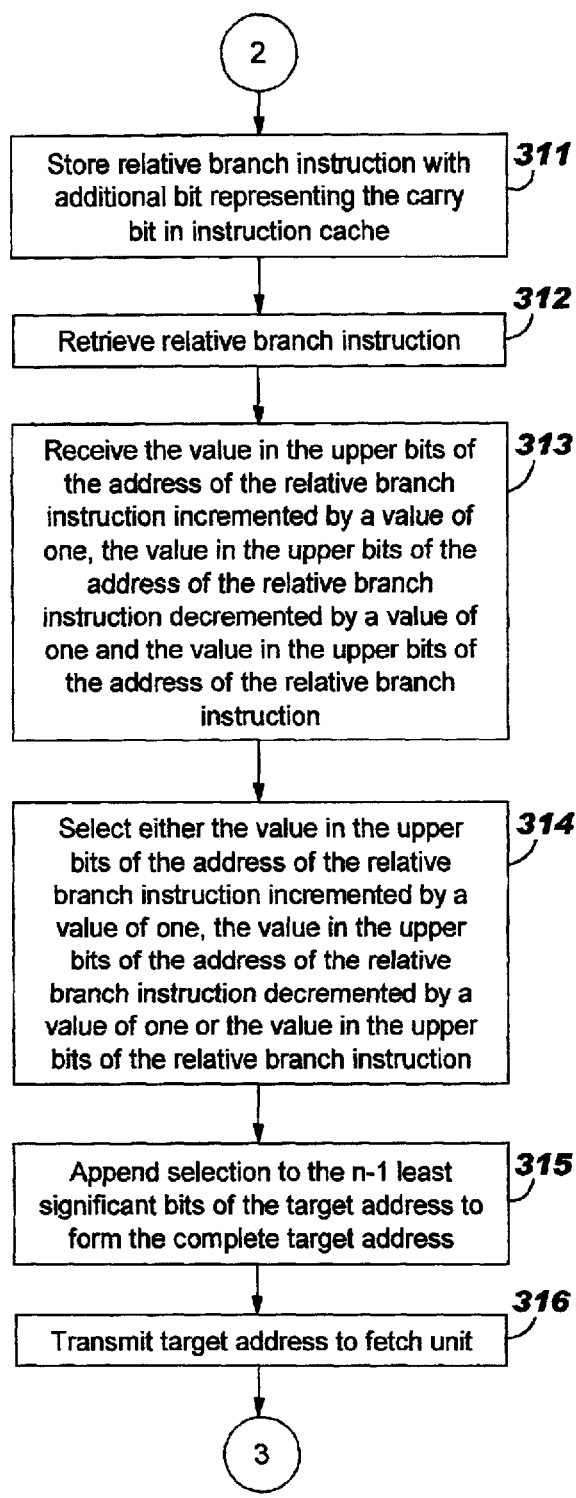
Figure 3:
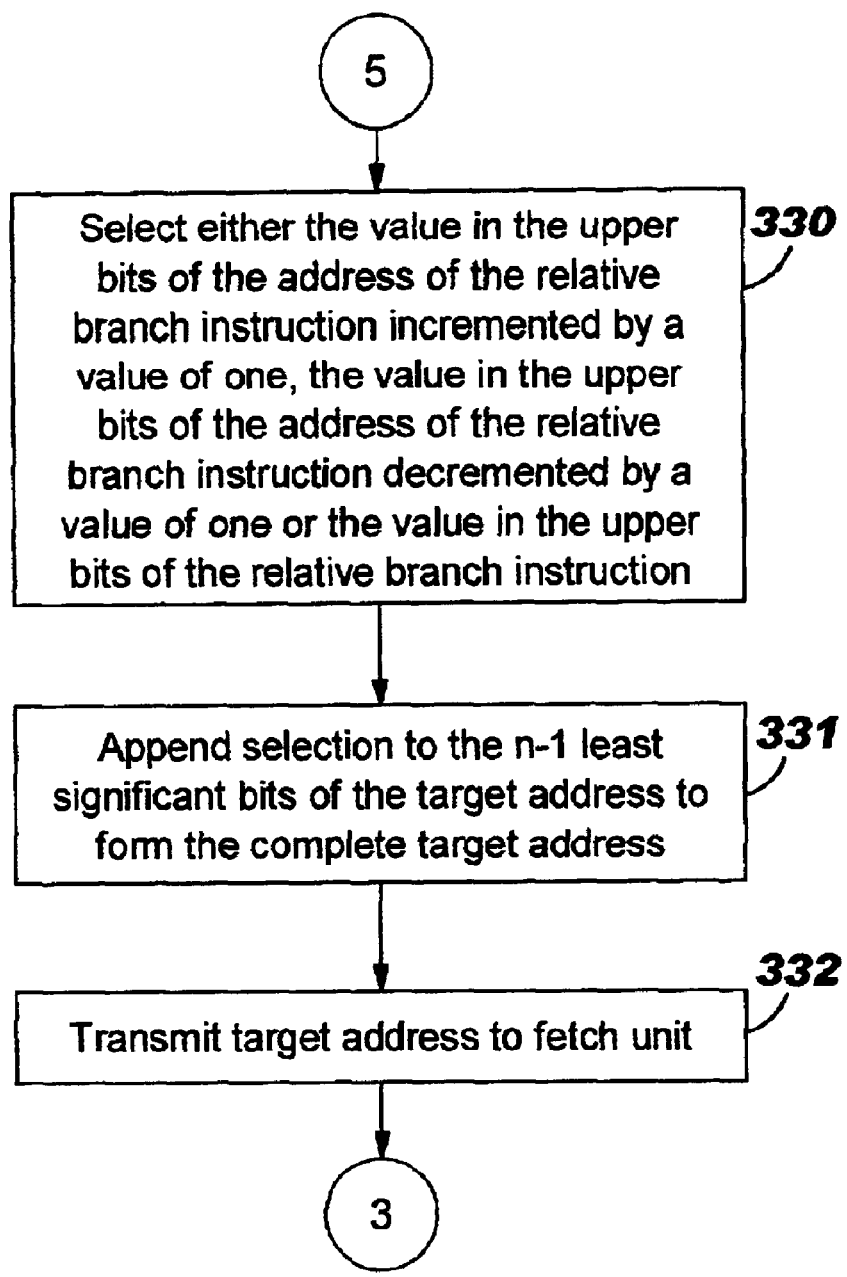

FIG. 3—Method for Calculating a Branch Target Address

FIG. 3 is a flowchart of one embodiment of the present invention of a method 300 for calculating a branch target address upon fetching the branch instruction from the instruction cache.

Figure 4:
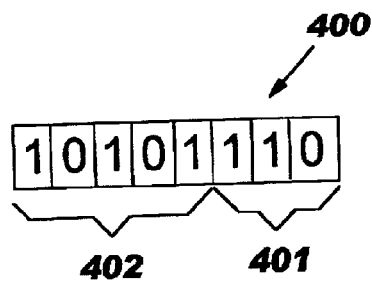
FIG. 4 illustrates an exemplary relative branch instruction.

Returning now to FIG. 3, in conjunction with FIG. 2, in step 301, the next instruction to execute may be identified by fetch unit 201. In step 302, instruction cache 203 may be searched for a copy of the address of the instruction identified in step 301 by fetch unit 201. In step 303, fetch unit 201 may generate a multiplicity of values by decrementing the value in the upper bits of the address of the instruction identified in step 301 by the value of one as well as incrementing the value in the upper bits of the address by the value of one as illustrated in FIG. 4. These values may be used to calculate the target address of a relative branch instruction as discussed in greater detail further below.

Referring to FIG. 4, FIG. 4 illustrates an 8-bit address 400 of the instruction, e.g., relative branch instruction, identified in step 301. Address 400 may comprise a value in upper bits 402, e.g., binary value of 10101. As stated above, in step 303, fetch unit 201 may generate a multiplicity of values by decrementing the value in upper bits 402 of address 400 by the value of one as well as incrementing the value in upper bits 402 of address 400 by the value of one. In the example of FIG. 4, the value in upper bits 402 of address 400 incremented by the value of one has the binary value of 10110. The value in upper bits 402 of address 400 decremented by the value of one has the binary value of 10100. In one embodiment, fetch unit 201 may comprise a one bit adder configured to add a positive value of one to the value in upper bits 402 of address 400 and configured to add a negative value of one to the value in upper bits 402 of address 400. It is noted that the address of a branch instruction may comprise any number of bits and that FIG. 4 is illustrative.

Returning again to FIGS. 2 and 3, in step 304, fetch unit 201 may transmit the following values to decode/selecting logic unit 204: the value in upper bits 402 of address 400 of the instruction identified, the value in upper bits 402 of address 400 of the instruction identified incremented by the value of one and the value in upper bits 402 of address 400 of the instruction identified decremented by the value of one.

In step 305, a determination may be made by instruction cache 203 as to whether a cache miss occurred as a result of the search performed in step 302. If a copy of the address of the instruction identified in step 301 is located within instruction cache 203, a "cache hit" is said to occur. If a copy of the address of the instruction identified in step 301 is not located within instruction cache 203, a "cache miss" is said to occur.

If a cache miss occurred, then the instruction identified in step 301 may be fetched from memory 102 by instruction cache 203 in step 306. In step 307, a determination may be made by encoding logic unit 202 as to whether the fetched instruction is a relative branch instruction. As stated above, a relative branch instruction may be a branch instruction that stores n bits of an offset of the target address. A value stored in the n−1 least significant bits in the offset of the target address may be used to calculate the n−1 least significant bits of the target address as explained in greater detail below. In one embodiment, encoding logic unit 202 may be configured to determine if the fetched instruction is a relative branch instruction by reading the operation code ("op code") of the fetched instruction.

Figure 5:
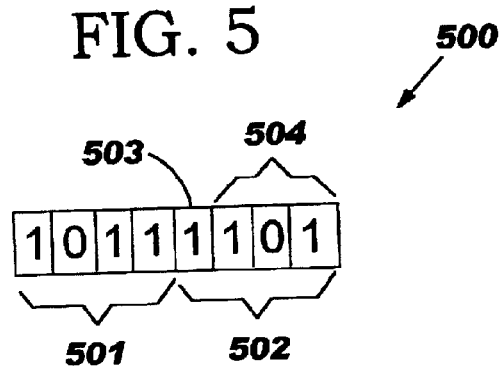
FIG. 5 illustrates an exemplary address of the exemplary relative branch instruction.

Upon determining that the fetched instruction is a relative branch instruction, then n−1 least significant bits of the target address of the relative branch instruction may be calculated in step 308. In one embodiment, the n−1 least significant bits of the target address of the relative branch instruction may be calculated by adding a value stored in the n−1 least significant bits in the offset of the target address to a value stored in the n−1 least significant bits in the address of the relative branch instruction. The uppermost bit in the offset may be reserved to store a sign bit as illustrated in FIG. 5. It is noted that even though the following discusses calculating the n−1 least significant bits of the target address that a different portion of the target address may be calculated using method 300. It is further noted that the portion, e.g., the n−1 least significant bits, of the target address of the relative branch instruction may be calculated using other means and that such embodiment employing such means would fall within the scope of the present invention.

Referring to FIG. 5, FIG. 5 illustrates an exemplary 8-bit relative branch instruction 500 where the first four bits 501 store the op code and the last n bits 502, e.g., four bits, store the offset of the target address. As stated above, the uppermost bit in the offset may be reserved to store a sign bit 503. The remaining bits 504 may represent the n−1 least significant bits. The binary value of 101 in bits 504 may be the value in the offset to be added to a value in the address of the relative branch instruction as explained in greater detail below. It is noted that a relative branch instruction may comprise any number of bits and that the op code and offset of the target address may be stored in any number of bits. It is further noted that FIG. 5 is illustrative.

As stated above, upon determining that the fetched instruction is a relative branch instruction, then a value stored in the n−1 least significant bits of the offset of the target address stored in the relative branch instruction may be added to a value stored in the n−1 least significant bits in the address of the relative branch instruction as illustrated in FIG. 4.

Returning again to FIG. 4, the lower n−1 bits 401, e.g., lower three bits, of address 400 of instruction, e.g., relative branch instruction, identified in step 301, may store the value, e.g., binary value 110, to be added to the value stored in the n−1 least significant bits, e.g., binary value 101, in the offset of the target address in order to calculate the n−1 least significant bits of the target address.

Figure 6:
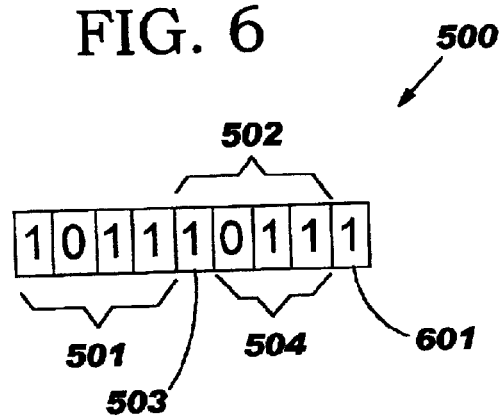
FIG. 6 illustrates the exemplary relative branch instruction tagged with a carry bit.

Referring to FIGS. 3–5, as stated above, the value in the n−1 least significant bits of the offset of the target address stored in the relative branch instruction is the binary value of 101 and the value stored in the n−1 least significant bits in the address of the relative branch instruction is the binary value of 110. The result of adding the binary values of 101 and 111 in step 308 of method 300 results in the binary value of 011 with a carry of 1. The result of the calculation in step 308, e.g., binary value of 011, may replace the n−1 least significant bits of the offset of the target address in the relative branch instruction in step 309. That is, the n−1 least significant bits of the target address may replace the n−1 least significant bits of the offset of the target address in the relative branch instruction as illustrated in FIG. 6. FIG. 6 illustrates replacing the value stored in bits 504, i.e., the n−1 least significant bits of the offset of the target address, in relative branch instruction 500 used in the calculation performed in step 308 with the value of the result of the calculation performed in step 308, e.g., binary value 011.

In step 310, a carry bit storing the value of the carry in the calculation performed in step 308 may be appended to the relative branch instruction thereby expanding the length of the instruction by one bit as illustrated in FIG. 6. For example, as stated above, the result of adding the binary value of 101 in the offset of the target address with the binary value of 111 in the address in step 308 resulted in a carry of 1. Subsequently, the carry bit may have a binary value of "1". FIG. 6 illustrates expanding the length of relative branch instruction 500 by one bit 601 storing the carry bit, e.g., binary value of 1. It is noted that if there was no carry in the calculation performed in step 308, the carry bit may have a binary value of "0".

In step 311, the relative branch instruction storing the result of the calculation performed in step 308 appended with the carry bit may be stored in instruction cache 203. In step 312, the relative branch instruction stored in instruction cache 203 may be retrieved by decode/selecting logic unit 204. Referring to FIG. 6, the relative branch instruction retrieved by decode/selecting logic unit 204 may comprise a sign bit 503, a carry bit 601 and the result of the calculation performed in step 308 as stored in bits 504.

In step 313, decode/selecting logic unit 204 may further receive the address 400 of the instruction identified in step 301, e.g., the relative branch instruction, including the value in upper bits 402 of address 400 as well as the value in upper bits 402 decremented by the value of one and the value in upper bits 402 incremented by the value of one from fetch unit 201. In one embodiment, decode/selecting logic unit 204 may receive the value in upper bits 402 of address 400, the value in upper bits 402 of address 400 decremented by the value of one and the value in upper bits 402 of address 400 incremented by the value of one prior to receiving the relative branch instruction from instruction cache 203 in step 313.

In step 314, a selection of either the value in upper bits 402 of address 400 incremented by the value of one, the value in upper bits 402 of address 400 decremented by the value of one or the value in upper bits 402 of address 400 may be performed by decode/selecting logic unit 204. In one embodiment, decode/selecting logic unit 204 may select one of these three possible selections based on the binary value of sign bit 503 and carry bit 601. In one embodiment, a value of one for sign bit 503 may represent subtracting the value of one from upper bits 402 of address 400; whereas, a value of one for carry bit 601 may represent adding a value of one to upper bits 402 of address 400. For example, if sign bit 503 is the value of one and carry bit 601 is the value of zero, then the value in upper bits 402 of address 400 decremented by the value of one is selected. If sign bit 503 is the value of zero and carry bit 601 is the value of one, then the value in upper bits 402 of address 400 incremented by the value of one is selected. However, if sign bit 503 and carry bit 601 are both a value of one as illustrated in FIG. 6 or both a binary value of zero, then the value in upper bits 402 of address 400 not incremented or decremented is selected. It is noted that in another embodiment, a value of one for sign bit 503 may represent subtracting the value of one from the value in upper bits 402 of address 400; whereas, a value of one for carry bit 601 may represent adding the value of one to the value in upper bits 402 of address 400.

In step 315, the selection made in step 315, e.g., upper bits 402 of address 400 (binary value of 10101), may be appended to the n−1 least significant bits of the target address calculated in step 308, e.g., 011, thereby forming the complete branch target address, e.g., binary value of 10101011, by decode/selecting logic unit 204. Consequently, the target address of a relative branch instruction upon retrieving the relative branch instruction from the instruction cache may be determined without implementing adders while not substantially increasing the instruction length.

In step 316, the complete target address, e.g., binary value of 10101011, may be transmitted to fetch unit 201. Fetch unit 201 may then determine if the instruction at the target is the next instruction to be executed in step 301.

Returning to FIG. 3, in conjunction with FIG. 2, in step 307 of FIG. 3, if encoding logic unit 202 determined that the instruction identified in step 301 is not a relative branch instruction, then encoding logic unit 202 may determine if the instruction identified in step 301 is an absolute branch instruction in step 317. As stated above, a target address may be calculated in an absolute branch instruction by sign extending the upper bits of the branch address with the offset of the target address stored in the absolute branch instruction as explained in greater detail below. In one embodiment, encoding logic unit 202 may be configured to determine if the fetched instruction is an absolute branch instruction by reading the op code of the fetched instruction.

Figure 7:
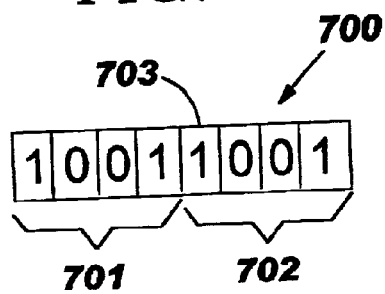
FIG. 7 illustrates an exemplary absolute branch instruction.
Figure 8:
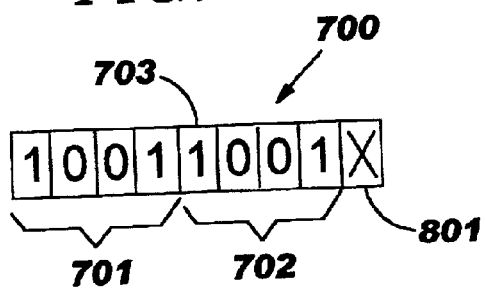
FIG. 8 illustrates the exemplary absolute branch instruction tagged with an additional bit.

If the instruction identified in step 301 is an absolute branch instruction, then an additional bit may be appended to the absolute branch instruction by encoding logic unit 202 in step 318 thereby increasing the length of the branch instruction by one bit as illustrated in FIGS. 7 and 8.

FIG. 7 illustrates an exemplary 8-bit absolute branch instruction 700 where the first four bits 701 store the op code and the last four bits 702 store the offset of the target address. The uppermost bit in the offset may be reserved to store a sign bit 703. It is noted that an absolute branch instruction may comprise any number of bits and that the op code and offset of the target address may be stored in any number of bits. It is further noted that FIG. 7 is illustrative.

As stated above, if the instruction identified in step 301 is an absolute branch instruction, then an additional bit may be appended to the absolute branch instruction by encoding logic unit 202 in step 318 thereby increasing the length of the absolute branch instruction by one bit. FIG. 8 illustrates appending an extra bit 801 to absolute branch instruction 700 thereby expanding the length of the absolute branch instruction by one bit. In one embodiment, the additional bit appended to the absolute branch instruction may be a don't care.

Returning to FIGS. 2 and 3, in step 319, the absolute branch instruction appended with the additional bit may be stored in instruction cache 203. In step 320, the absolute branch instruction stored in instruction cache 203 may be retrieved by decode/selecting logic unit 204 from instruction cache 203. In step 321, the branch target address may be calculated by decode/selecting logic unit 204 by sign extending the upper bits 701 of the branch instruction with bits 702 storing the offset, e.g., binary value of 1001, based on the binary value of sign bit 703. For example, referring to FIG. 7, since sign bit 703 has a value of one, the upper bits 701 of absolute branch instruction 700 may be sign extended with a value of one. Hence, for an 8-bit target address, the target address would be 11111001 where the binary value of sign bit 703 is replicated in the upper bits 701 of the absolute branch instruction.

In step 322, the complete target address, e.g., binary value of 11111001, may be transmitted to fetch unit 201. Fetch unit 201 may then determine if the instruction at the target is the next instruction to be executed in step 301.

Figure 9:
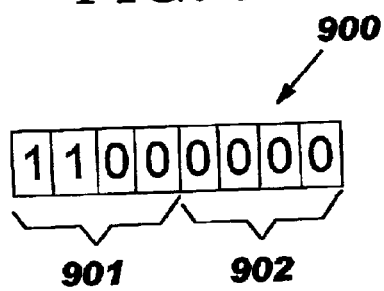
FIG. 9 illustrates an exemplary instruction.
Figure 10:
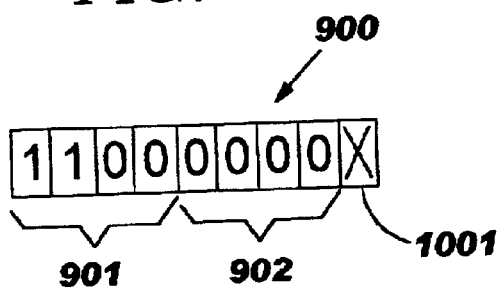
FIG. 10 illustrates the exemplary instruction tagged with an additional bit.

Returning to step 317 of FIG. 3, if encoding logic unit 202 determined that the fetched instruction is not an absolute branch instruction, then an additional bit may be appended to the instruction by encoding logic unit 202 in step 323 thereby increasing the length of the instruction by one bit as illustrated in FIGS. 9 and 10.

FIG. 9 illustrates an exemplary 8-bit instruction 900 where the first four bits 901 store the op code and the last four bits 902 store the operand(s). It is noted that instruction 900 may comprise any number of bits and that the op code and operand(s) may be stored in any number of bits. It is further noted that FIG. 9 is illustrative.

As stated above, if the instruction is not an absolute branch instruction, then an additional bit may be appended to the instruction by encoding logic unit 202 in step 319 thereby increasing the length of the instruction by one bit. FIG. 10 illustrates appending an extra bit 1001 to instruction 1000 thereby expanding the length of the instruction by one bit. In one embodiment, the additional bit appended to the instruction may be a don't care.

Returning to FIGS. 2 and 3, in step 324, the instruction appended with the additional bit may be stored in instruction cache 203. In step 325, the instruction may be retrieved by decode/selecting logic unit 204 from instruction cache 203. In step 326, the received instruction may be executed by an appropriate execution unit, e.g., instruction execution unit 205, floating point unit 206.

Returning to step 305 of FIG. 3, if a cache hit occurred, then decode/selecting logic unit 204 may determine if the instruction identified in step 301 is a relative branch instruction in step 327.

As stated above, a relative branch instruction may be a branch instruction that stores n bits of an offset of the target address. A value stored in the n−1 least significant bits in the offset of the target address may be used to calculate the n−1 least significant bits of the target address as explained in greater detail below. In one embodiment, decode/selecting logic unit 204 may be configured to determine if the instruction identified in step 301 is a relative branch instruction by reading the op code of the instruction identified in step 301.

Upon determining that the instruction identified in step 301 is a relative branch instruction, the relative branch instruction with the additional bit, e.g., relative branch instruction 600 (FIG. 6), may be retrieved from instruction cache 203 by decode/selecting logic unit 204 in step 328. Since a copy of the address of the relative branch instruction was stored in instruction cache 203, i.e., there was a cache hit, the n−1 least significant bits of the target address of the relative branch instruction have already been calculated and inserted in the n−1 least significant bits of the relative branch instruction. Consequently, the n−1 least significant bits of the target address need not be calculated. Furthermore, since a copy of the address of the relative branch instruction was stored in instruction cache 203, i.e., there was a cache hit, an additional bit has already been appended to the instruction. Consequently, an additional bit does not have to be appended to the relative branch instruction.

Referring to FIGS. 2–4, in step 329, decode/selecting logic unit 204 may further receive the value in upper bits 402 of address 400 of the instruction identified in step 301, e.g., the relative branch instruction, as well as the value in upper bits 402 of address 400 decremented by the value of one and the value in upper bits 402 of address 400 incremented by the value of one from fetch unit 201. In one embodiment, decode/selecting logic unit 204 may receive the value in upper bits 402 of address 400, the value in upper bits 402 of address 400 decremented by the value of one and the value in upper bits 402 of address 400 incremented by the value of one prior to retrieving the relative branch instruction from instruction cache 203 in step 328.

Referring to FIGS. 2–4 and 6, in step 330, a selection of either the value in upper bits 402 of address 400 incremented by the value of one, the value in upper bits 402 of address 400 decremented by the value of one or the value in upper bits 402 of address 400 may be performed by decode/selecting logic unit 204. In one embodiment, decode/selecting logic unit 204 may select one of these three possible selections based on the binary value of sign bit 503 and carry bit 601. In one embodiment, a value of one for sign bit 503 may represent subtracting the value of one from upper bits 402 of address 400; whereas, a value of one for carry bit 601 may represent adding a value of one to upper bits 402 of address 400. For example, if sign bit 503 is the value of one and carry bit 601 is the value of zero, then the value in upper bits 402 of address 400 decremented by the value of one is selected. If sign bit 503 is the value of zero and carry bit 601 is the value of one, then the value in upper bits 402 of address 400 incremented by the value of one is selected. However, if sign bit 503 and carry bit 601 are both a value of one as illustrated in FIG. 6 or both a binary value of zero, then the value in upper bits 402 of address 400 not incremented or decremented is selected. It is noted that in another embodiment, a value of one for sign bit 503 may represent subtracting the value of one from the value in upper bits 402 of address 400; whereas, a value of one for carry bit 601 may represent adding the value of one to the value in upper bits 402 of address 400.

In step 331, the selection made in step 330, e.g., upper bits 402 of address 400 (binary value of 10101), may be appended to the n−1 least significant bits of the target address in relative branch instruction 400, e.g., binary value of 011, thereby forming the complete branch target address, e.g., binary value of 10101011, by decode/selecting logic unit 204. Consequently, the target address of a relative branch instruction upon retrieving the relative branch instruction from the instruction cache may be determined without implementing adders while not substantially increasing the instruction length.

In step 332, the complete target address, e.g., binary value of 10101011, may be transmitted to fetch unit 201. Fetch unit 201 may then determine if the instruction at the target is the next instruction to be executed in step 301.

Referring to step 327 of FIG. 3, if decode/selecting logic unit 204 determined that the instruction identified in step 301 is not a relative branch instruction, then decode/selecting logic unit 204 may determine if the instruction identified in step 301 is an absolute branch instruction in step 333. As stated above, a target address may be calculated in an absolute branch instruction by sign extending the upper bits of the branch address with the offset of the target address stored in the absolute branch instruction as explained in greater detail below. In one embodiment, encoding logic unit 202 may be configured to determine if the fetched instruction is an absolute branch instruction by reading the op code of the fetched instruction.

If the instruction identified in step 301 is an absolute branch instruction, then the absolute branch instruction, e.g., absolute branch instruction 700 (FIG. 8), may be retrieved from instruction cache 203 by decode/selecting logic unit 204 in step 334. Since a copy of the address of the absolute branch instruction was stored in instruction cache 203, i.e., there was a cache hit, an additional bit had already been appended to the absolute branch instruction. Consequently, an additional bit does not have to be appended to the absolute branch instruction.

Referring to FIGS. 2, 3 and 8, in step 336, the branch target address may be calculated by decode/selecting logic unit 204 by sign extending the upper bits 701 of the branch instruction with bits 702 storing the offset, e.g., binary value of 1001, based on the binary value of sign bit 703. For example, referring to FIG. 8, since sign bit 703 has a value of one, the upper bits 701 of absolute branch instruction 700 may be sign extended with a value of one. Hence, for an 8-bit target address, the target address would be the binary value of 11111001 where the binary value of sign bit 703 is replicated in the upper bits 701 of the absolute branch instruction.

In step 336, the complete target address, e.g., binary value of 11111001, may be transmitted to fetch unit 201. Fetch unit 201 may then determine if the instruction at the target is the next instruction to be executed in step 301.

Returning to step 333 of FIG. 3, if decode/selecting logic unit 204 determined that the instruction identified in step 301 is not an absolute branch instruction, then decode/selecting logic unit 204 may retrieve the instruction appended with the additional bit, e.g., instruction 900 (FIG. 10) from instruction cache 203 in step 337. Since a copy of the address of the instruction was stored in instruction cache 203, i.e., there was a cache hit, an additional bit has already been appended to the absolute branch instruction. Consequently, an additional bit does not have to be appended to the instruction.

In step 338, the retrieved instruction may be executed by an appropriate execution unit, e.g., instruction execution unit 205, floating point unit 206.

It is noted that method 300 may be executed in a different order presented and that the order presented in the discussion of FIG. 3 is illustrative. It is further noted that certain steps in method 300 may be executed almost concurrently.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for calculating a branch target address comprising the steps of:

fetching a branch instruction from a memory, wherein said branch instruction stores an offset of a target address comprising n bits;

calculating n−1 least significant bits of said target address of said branch instruction;

replacing n−1 least significant bits of said offset of said target address with said n−1 least significant bits of said target address of said branch instruction; and appending a carry bit to said branch instruction thereby increasing a length of said branch instruction by one bit.

2. The method as recited in claim 1 further comprising the steps of:

calculating a set of upper order bit value combinations of an address of said branch instruction;

storing said branch instruction storing said n−1 least significant bits of said target address in a cache;

retrieving said branch instruction storing said n−1 least significant bits of said target address from said cache; and selecting a one of said set of upper order bit value combinations of said address of said branch instruction.

3. The method as recited in claim 2 further comprising the step of:

appending said selected one of said set of upper order bit value combinations of said address of said branch instruction with said n−1 least significant bits of said target address to calculate said target address of said branch instruction.

4. The method as recited in claim 2, wherein said set of upper order bit value combinations of said address of said branch instruction comprises one or more of the following: a value in said upper order bits of said address of said branch instruction incremented by one, said value in said upper order bits of said address of said branch instruction decremented by one and said value in said upper order bits of said address of said branch instruction.

5. The method as recited in claim 2, wherein said one of said set of upper order bit value combinations is selected in response to a value in a sign bit and a value in said carry bit in said branch instruction.

6. A system, comprising:
a memory configured to store instructions;
a cache coupled to said memory, wherein said cache is configured to fetch an instruction from said memory; and
an encoding logic unit coupled to said cache, wherein said encoding logic unit is configured to encode said fetched instruction, wherein said encoding logic unit is configured to determine if said instruction is a relative branch instruction, wherein said relative branch instruction stores an offset of a target address comprising n bits, wherein if said instruction is said relative branch instruction then said encoding logic unit is configured to calculate n−1 least significant bits of said target address, wherein said encoding logic unit is further configured to replace n−1 least significant bits of said offset of said target address with said n−1 least significant bits of said target address;
wherein said encoding logic unit is further configured to append a carry bit to said relative branch instruction thereby increasing a length of said relative branch instruction by one bit.

7. The system as recited in claim 6 further comprises:
a fetch unit coupled to said cache, wherein said fetch unit is configured to calculate a set of upper order bit value combinations of an address of said relative branch instruction.

8. The system as recited in claim 7, wherein said cache is configured to store said relative branch instruction storing said n−1 least significant bits of said target address.

9. The system as recited in claim 8, further comprises:
a logic unit coupled to said cache, wherein said logic unit is configured to retrieve said relative branch instruction storing said n−1 least significant bits of said target address from said cache.

10. The system as recited in claim 9, wherein said logic unit is further configured to receive said set of upper order bit value combinations of said address of said relative branch instruction from said fetch unit.

11. The system as recited in claim 10, wherein said logic unit is further configured to select a one of said set of upper order bit value combinations of said address of said relative branch instruction.

12. The system as recited in claim 11, wherein said logic unit is further configured to append said selected one of said set of upper order bit value combinations of said address of said relative branch instruction with said n−1 least significant bits of said target address to calculate said target address.

13. The system as recited in claim 7, wherein said set of upper order bit value combinations of said address of said relative branch instruction comprises one or more of the following: a value in said upper order bits of said address of said relative branch instruction incremented by one, said value in said upper order bits of said address of said relative branch instruction decremented by one and said value in said upper order bits of said address of said relative branch instruction.

14. The system as recited in claim 11, wherein said one of said set of upper order bit value combinations is selected in response to a value in a sign bit and a value in said carry bit in said branch instruction.

15. A system, comprising:
means for storing instructions;
means for fetching an instruction;
means for encoding said fetched instruction;
means for determining if said instruction is a relative branch instruction, wherein said relative branch instruction stores an offset of a target address comprising n bits, wherein if said instruction is said relative branch instruction then the system further comprises:
means for calculating n−1 least significant bits of said target address; and
means for replacing n−1 least significant bits of said offset of said target address with said n−1 least significant bits of said target address; and
means for appending a carry bit to said relative branch instruction thereby increasing a length of said relative branch instruction by one bit.

16. The system as recited in claim 15 further comprises:
means for calculating a set of upper order bit value combinations of an address of said relative branch instruction.

17. The system as recited in claim 16 further comprises:
means for storing said relative branch instruction storing said n−1 least significant bits of said target address.

18. The system as recited in claim 17 further comprises:
means for retrieving said relative branch instruction storing said n−1 least significant bits of said target address.

19. The system as recited in claim 18 further comprises:
means for receiving said set of upper order bit value combinations of said address of said relative branch instruction.

20. The system as recited in claim 19 further comprises:
means for selecting a one of said set of upper order bit value combination of said address of said relative branch instruction.

21. The system as recited in claim 20 further comprises:
means for appending said selected one of said set of upper order bit value combination of said address of said relative branch instruction with said n−1 least significant bits of said target address to calculate said target address.

22. The system as recited in claim 16, wherein said set of upper order bit value combinations of said address of said relative branch instruction comprises one or more of the following: a value in said upper order bits of said address of said relative branch instruction incremented by one, said value in said upper order bits of said address of said relative branch instruction decremented by one and said value in said upper order bits of said address of said relative branch instruction.

23. The system as recited in claim 20, wherein said one of said set of upper order bit value combinations is selected in response to a value in a sign bit and a value in said carry bit in said branch instruction.

24. A processor, comprising:
a cache configured to fetch an instruction; and
an encoding logic unit coupled to said cache configured to encode said fetched instruction, wherein said encoding logic unit is configured to determine if said instruction is a relative branch instruction, wherein said relative branch instruction stores an offset of a target address comprising n bits, wherein if said instruction is said relative branch instruction then said encoding logic unit is configured to calculate n−1 least significant bits of said target address, wherein said encoding logic unit is further configured to replace n−1 least significant bits of said offset of said target address with said n−1 least significant bits of said target address;

wherein said encoding logic unit is further configured to append a carry bit to said relative branch instruction thereby increasing a length of said relative branch instruction by one bit.

25. The processor as recited in claim 24 further comprises:

a fetch unit coupled to said cache, wherein said fetch unit is configured to calculate a set of upper order bit value combinations of an address of said relative branch instruction.

26. The processor as recited in claim 25, wherein said cache is configured to store said relative branch instruction storing said n−1 least significant bits of said target address.

27. The processor as recited in claim 26 further comprises:

a logic unit coupled to said cache, wherein said logic unit is configured to retrieve said relative branch instruction storing said n−1 least significant bits of said target address from said cache.

28. The processor as recited in claim 27, wherein said logic unit is further configured to receive said set of upper order bit value combinations of said address of said relative branch instruction from said fetch unit.

29. The processor as recited in claim 28, wherein said logic unit is further configured to select a one of said set of upper order bit value combinations of said address of said relative branch instruction.

30. The processor as recited in claim 29, wherein said logic unit is further configured to append said selected one of said set of upper order bit value combinations of said address of said relative branch instruction with said n−1 least significant bits of said target address to calculate said target address.

31. The processor as recited in claim 25, wherein said set of upper order bit value combinations of said address of said relative branch instruction comprises one or more of the following: a value in said upper order bits of said address of said relative branch instruction incremented by one, said value in said upper order bits of said address of said relative branch instruction decremented by one and said value in said upper order bits of said address of said relative branch instruction.

32. The processor as recited in claim 29, wherein said one of said set of upper order bit value combinations is selected in response to a value in a sign bit and a value in said carry bit in said branch instruction.

33. A processor, comprising:

means for fetching an instruction;

means for determining if said instruction is a relative branch instruction, wherein said relative branch instruction stores an offset of a target address comprising n bits, wherein if said instruction is said relative branch instruction then the processor further comprises:

means for calculating n−1 least significant bits of said target address; and means for replacing n−1 least significant bits of said offset of said target address with said n−1 least significant bits of said target address; and means for appending a carry bit to said relative branch instruction thereby increasing a length of said relative branch instruction by one bit.

34. The processor as recited in claim 33 further comprises:

means for calculating a set of upper order bit value combinations of an address of said relative branch instruction.

35. The processor as recited in claim 34 further comprises:

means for storing said relative branch instruction storing said n−1 least significant bits of said target address.

36. The processor as recited in claim 35 further comprises:

means for retrieving said relative branch instruction storing said n−1 least significant bits of said target address.

37. The processor as recited in claim 36 further comprises:

means for receiving said set of upper order bit value combinations of said address of said relative branch instruction from said fetch unit.

38. The processor as recited in claim 37 further comprises:

means for selecting one of said set of upper order bit value combinations of said address of said relative branch instruction.

39. The processor as recited in claim 38 further comprises:

means for appending said selected one of said set of upper order bit value combinations of said address of said relative branch instruction with said n−1 least significant bits of said target address to calculate said target address.

40. The processor as recited in claim 34, wherein said set of upper order bit value combinations of said address of said relative branch instruction comprises one or more of the following: a value in said upper order bits of said address of said relative branch instruction incremented by one, said value in said upper order bits of said address of said relative branch instruction decremented by one and said value in said upper order bits of said address of said relative branch instruction.

41. The processor as recited in claim 38, wherein said one of said set of upper order bit value combinations is selected in response to a value in a sign bit and a value in said carry bit in said branch instruction.

* * * * *